(No Model.)

M. E. LEFEBVRE.
ILLUMINATED PICTURE.

No. 587,007. Patented July 27, 1897.

Witnesses:

Inventor;
Marie Elmina Lefebvre,

UNITED STATES PATENT OFFICE.

MARIE ELMINA LEFEBVRE, OF QUEBEC, CANADA.

ILLUMINATED PICTURE.

SPECIFICATION forming part of Letters Patent No. 587,007, dated July 27, 1897.

Application filed December 3, 1896. Serial No. 614,335. (No specimens.) Patented in Canada August 5, 1896, No. 53,153.

*To all whom it may concern:*

Be it known that I, MARIE ELMINA LE-FEBVRE, a subject of Her Majesty Queen Victoria, Queen of Great Britain and Ireland, residing at Quebec, in the Province of Quebec, Dominion of Canada, have invented certain new and useful Improvements in Decorations and Paintings, of which the following is a specification, reference being had to the accompanying drawings, and to the numerals of reference marked thereon.

The subject-matter of this invention is patented in Canada under Patent No. 53,153, dated August 5, 1896.

This invention relates to an improvement in decorating and ornamenting pictures on glass or similar transparent substances, the object being to produce a highly ornamental and decorative picture illuminated by pigments of various colors, transparent or otherwise, mother-of-pearl, luminous paint, and other bodies capable of giving variety to certain portions of the picture in imitation of nature and art.

Figure 1:
Figure 2:
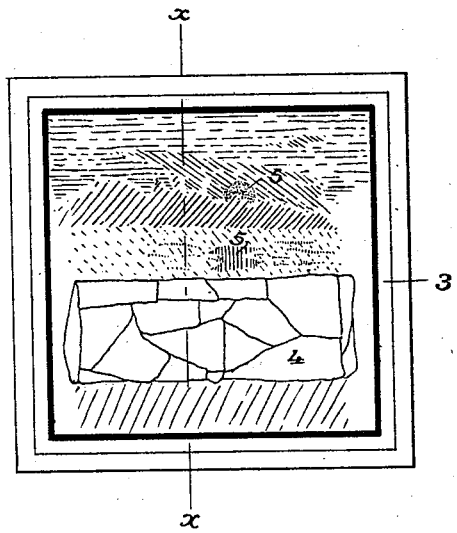
Figure 3:

Referring to the drawings, Figure 1 is a face view of a picture ornamented by my improved process. Fig. 2 is a rear view of the same, and Fig. 3 is a cross-section on the line *x x*.

In carrying out my invention I first mount on a transparent body—such as glass, celluloid, pyroxylin, or transparent tissue—the photograph to be decorated. This may be done either by direct printing on a suitably-prepared plate or by transferring to the transparent body the film of a photograph, decalcomania, lithograph, or solar print.

I first prepare the transparent mount by coating it with a transparent adhesive substance, (shown at 2 in the drawings.) On this prepared surface after it has hardened I place a photograph 3 of the subject to be decorated while still moist and soft from printing and toning. This photograph is preferably made on transferrotype or "stripping" paper, as known in the art. The mount with its attached photograph is then placed under pressure, where it remains for at least thirty minutes. It is then removed from the press and covered with hot water until the paper is soft and easily removable from the film, which remains on the transparent mount. Any portion of the picture not desired is removed from the mount by scraping away or otherwise removing the film. The film thus attached to the glass is painted in suitable colors to produce the required effect of an illuminated picture. The background is painted either in a flat color or ornamented by flowers, scrolls, or in any other selected way. To give effect to the high lights, mother-of-pearl 4 is secured to the film by a transparent varnish, which may be colored a suitable shade by transparent paint.

The reliefs, brilliant points, and high lights in the combination are improved, as before stated, by mother-of-pearl in sheets or pulverized. Ornamental results are also obtained by the use of brocades, flitters, mica, and other articles in the form of crystals, either natural or artificially produced, as also by gold or silver leaf and metal-coated paper.

When it is desired to have the picture illuminated at night or in the darkness, such parts are first covered with a uniform layer of luminous paint 5. If a colored light is desired, the luminous paint is first mixed with some transparent color, as anilin of suitable shade, over which is applied a coating of ordinary paint of the same shade. Instead of applying the luminous paint to the film it may be placed on a backing-sheet of some transparent or translucent substance.

The film and ornamentation are protected by paper secured thereto by varnish, which is then covered with plaster-of-paris or similar substance, or the paper may be omitted and the plaster-of-paris directly applied to the ornamented surface. To produce certain soft effects—as, for instance, flesh tints—I sometimes apply a sheet or film of gelatin or celluloid, preferably transparent, and on this I lay the colors.

To produce colored, painted, or stained windows, I use transparent colors entirely, omitting the mother-of-pearl and other opaque bodies. I prefer what is known as "glass colors," they being well known by artists for painting on glass, and for protecting the film and said colors employ a coating of glass-varnish.

Window-transparencies are made in the same way as colored or painted windows, except that the film and colors are protected by a second glass plate instead of by varnish. I can also make these transparencies of celluloid, which, being flexible and practically unbreakable and having little weight, is an excellent substance for the purpose.

I sometimes use in painting on glass what are known as "flowing" gelatin colors, which, being flexible, expand and contract with the glass and do not crack or break, as is common with other varieties of paint.

Having described my invention, I claim—

The herein-described method of ornamenting pictures, which consists in, first, coating a transparent plate or mount with a transparent adhesive substance; secondly, placing upon the transparent substance a photograph of the subject to be ornamented while the film is soft and moist; thirdly, drying the picture; fourthly, removing the paper from the film by hot water; fifthly, covering certain parts of the film with colored luminous paint; sixthly, covering the luminous paint with ordinary paint of the same shade; and, seventhly, applying a protective backing; substantially as set forth.

In testimony whereof I have hereunto set my hand and affixed my seal this 21st day of November, 1896.

MARIE ELMINA LEFEBVRE. [L. S.]

In presence of—
C. V. TESSIER,
E. GARANT.